United States Patent
DeBono (10) Patent No.: US 6,927,671 B2
(45) Date of Patent: Aug. 9, 2005

(54) BIOMETRIC SHIFTER LOCK CONTROL

(76) Inventor: Joseph M. DeBono, 3725 S. Ocean Dr., #512, Hollywood, FL (US) 33019

( * ) Notice: Subject to any disclaimer, the term of this patent is extended or adjusted under 35 U.S.C. 154(b) by 107 days.

(21) Appl. No.: 10/234,865

(22) Filed: Sep. 3, 2002

(65) Prior Publication Data
US 2004/0041689 A1 Mar. 4, 2004

(51) Int. Cl.⁷ .......................... C05B 19/00; G06F 7/00; G06T 1/00; G08B 29/00; H04B 1/00
(52) U.S. Cl. ...................... 340/5.83; 340/5.8; 340/5.51; 340/5.52; 340/5.53; 180/287
(58) Field of Search .......................... 340/5.52, 426.1, 340/456, 5.53, 5.82, 5.83, 5.84; 701/12, 36, 51, 57; 180/271, 278, 287, 286

(56) References Cited

U.S. PATENT DOCUMENTS

| | | | | |
|---|---|---|---|---|
| 3,637,037 A | * | 1/1972 | Doland et al. ............... | 180/287 |
| 4,976,171 A | * | 12/1990 | Sharp et al. ................... | 477/96 |
| 5,179,868 A | * | 1/1993 | Thibeault ................... | 74/411.5 |
| 5,431,244 A | * | 7/1995 | Possobom ................... | 180/287 |
| 5,488,846 A | * | 2/1996 | Green .......................... | 70/247 |
| 5,598,140 A | * | 1/1997 | Eizen ..................... | 340/426.25 |
| 5,812,067 A | * | 9/1998 | Bergholz et al. ........... | 340/5.52 |
| 5,827,149 A | * | 10/1998 | Sponable ..................... | 477/92 |
| 6,100,811 A | * | 8/2000 | Hsu et al. .................. | 340/5.83 |
| 6,373,148 B1 | * | 4/2002 | Daiss et al. ................ | 307/10.5 |
| 6,710,700 B1 | * | 3/2004 | Tatsukawa et al. ........ | 340/5.53 |

* cited by examiner

Primary Examiner—Michael Horabik
Assistant Examiner—Nam Nguyen
(74) Attorney, Agent, or Firm—Donald W. Meeker (57) ABSTRACT

A biometric anti-theft gear shifter lock control for vehicles, equipment, and machinery, and other transmission actuation devices on land, water, and air, using a gear shifter. A biometric sensor scans in biometric information from a user to a central processing unit (CPU). The CPU finding a match for an authorized user deactivates a shift lock which may be built into an automatic shift vehicle or a solenoid or other switch added to a standard shift vehicle. It sounds an alarm for an unauthorized user. The control may be positioned on a gear shift knob with a flip-type protective cover. The biometrics device could be a fingerprint scanner, a retina scanner, a voice recognition system or other device programmed to operate only upon recognition of a unique biometrically measurable characteristic of one or more authorized users whose biometric data is programmed into the system.

15 Claims, 9 Drawing Sheets

BIOMETRIC SHIFTER LOCK CONTROL

BACKGROUND OF THE INVENTION

1. Field of the Invention

The present invention relates to a biometric anti-theft device and in particular to a biometric shifter lock control which uses a biometric sensor to control the release of a shifter lock on any vehicle, equipment, or machinery having a transmission shift actuator on land, water, or air.

2. Description of the Prior Art

The increase in the number of thefts and unauthorized uses of vehicles, boats, aircraft, heavy equipment, machinery and other devices having transmission actuators has lead to the development of various anti-theft devices. These anti-theft devices include, among others, steering locks, steering and pedal locks, hand brake locks, alarm systems, and immobilizer systems.

A variety of systems have been developed to reduce the ease with which automobiles are stolen due to the frequency of automobile theft. Some of the systems involve locking the vehicle transmission in some manner. The problems inherent in these systems are the ease of bypassing the system when the locking device is located on the outside of the transmission or the difficulty of installation when the locking device is located on the inside of the transmission.

U.S. Pat. No. 5,598,140, issued Jan. 28, 1997 to Eizen provides a vehicle anti-theft device requiring a key for operation and comprising a gear shift lock and an ancillary vehicle anti-theft device, such as one or more of the following: audio or visual alarm, ignition or vehicle operation interlocking means, intrusion or vehicle motion detection apparatus, any other suitable vehicle anti-theft device which is operated automatically by operation of the gear shift lock.

French Patent No. 2,572,037, issued on Oct. 22, 1984, to Barbarot teaches an encoder linked to an electromagnetic device which engages a multiple rocker arm mechanism that locks the clutch cable thereby preventing movement of the clutch lever.

U.S. Pat. No. 1,662,099, issued on Mar. 13, 1928, to O. A. Anderson teaches a mechanical locking device for motor vehicles that operates in conjunction with the ignition switch to lock the transmission. The patent shows the ignition switch mounted in the transmission shifting lever where insertion and rotation of the key causes a plunger in the shifting lever to engage the transmission shifting ball allowing the user to then shift gears. When the key is then rotated in the opposite direction, thereby turning off the engine, the plunger is released from the ball and the shifting lever will no longer operate to shift the gears in the transmission.

U.S. Pat. No. 4,615,355, issued on Oct. 7, 1986, to Garcia et al. teaches an automobile anti-theft device which mechanically locks the automatic transmission of an automobile utilizing a bolt which blocks the shifting lever, detent lever or manual valve. The bolt is held in proper position by a series of metal plates fixedly attached to a base which is then attached to the lever to be locked. The bolt is held in the locked position by a spring which the bolt runs through. The bolt is moved into the unlocked position by means of a steel cable, electromagnetic device or vacuum. The means used to unlock the bolt (steel cable, electromagnetic or vacuum) is not described except to indicated that they are available methods to move the bolt out of the locking position. However, an armored line employed to prevent tampering of the locking means is described.

U.S. Pat. No. 4,976,171, issued on Dec. 11, 1990, to Sharp et al. teaches a transmission shifter to operate controlled mechanism interlock utilizing a cable assembly attached to a toothed rack and a pawl operated by a solenoid that engages the teeth of the rack. The locking device is activated when the transmission selector lever is placed in the park position. It is deactivated when the operator of the vehicle places his/her foot on the service brake thus allowing the selector lever to be moved from a non-drive position to a drive position. This device does not provide any security for the vehicle which one of the intents of the present invention. This device also requires a steering column lock which is a common theft deterrent method.

U.S. Pat. No. 4,947,968, issued on Aug. 14, 1990, to Slavin et al. teaches a transmission mounted solenoid interlock device which is mounted on the transmission and when energized or de-energized will engage a notch located on the shift actuating lever.

U.S. Pat. No. 3,610,004, issued on Oct. 5, 1971, to Neese teaches a parking lock for transmissions that employs a locking wheel fixed to a transmission output shaft that is engaged by a spring activated piston and rod device. The rod is disengaged from the locking wheel by hydraulic pressure acting on the piston to overcome the force of the spring. A blocker pin is also moved into a position which prevents the piston from moving out of the unlock position. The hydraulic pressure is produced by the transmission when the engine is started. When the engine is shut off, the hydraulic pressure on the blocker bin and piston are released and the pressure of the spring forces the rod into the locking wheel.

U.S. Pat. No. 4,884,654, issued on Dec. 5, 1989, to Durigon teaches a transmission control locking device that disables the drive train utilizing a spring loaded solenoid that locks the clutch actuation lever when the transmission gear selector is placed in a predetermined position and the solenoid is de-energized. The solenoid is energized by a remotely controlled electronic circuit (not described) thereby releasing the clutch actuation lever.

U.S. Pat. No. 4,177,657, issued on Dec. 11, 1979, to Aydin teaches an electronic lock system utilizing an encoded key and decoder which activate an electric clutch operated bolt mechanism or will change the code which activates the electric clutch. The decoder can be an opto-electronic, magnetic other electrical device capable of decoded the encode key. The clutch is not activated until the key is removed from the lock thereby preventing the user from leaving the key in the lock. The system allows for operation by battery power since only the clutch need be activated and not the bolt mechanism itself. The system provides for multi-access levels (e.g. master keys, floor keys, backup keys, etc.). A timer is incorporated which switches power only to the circuits needed for operation at the time of use. The system may also be interfaced with other security devices such as an electronic alarm. The code on the key may be self canceling for one time use or may be controlled by a manual switch which restricts the number of uses.

U.S. Pat. No. 3,718,202 issued on Feb. 27, 1973, to Brock teaches vehicle anti-theft system utilizing an encoder panel which accepts a code sequence, a decoder and lock mechanism. The lock mechanism is comprised of a solenoid, shaft, extending member and locking gear. The locking gear is wedged between transmission gears to prevent movement of the drive train. A predetermined four digit code is entered into a control panel thereby operating the lock mechanism. The encoder-decoder combination may also be used to prevent ignition of the engine as well as preventing movement of the drive train. This device requires major design changes to the transmission to incorporate it into a transmission or to add it to an existing transmission.

U.S. Pat. No. 2,890,581, issued on Jun. 16, 1959, to D. T. Lewis teaches a device to lock the operator shift lever from moving until a positive act such as closing of the ignition switch or a manually operated device connected directly to the car lock is accomplished. This device is not protected from external tampering by a thief and does not protect the shift lever from external movement when the vehicle is locked.

U.S. Pat. No. 3,939,940, issued on Feb. 24, 1976, to Y. Sasabe et al. teaches a device to lock the gear shift mechanism of a manually operated power transmission system and utilizes a solenoid in combination with a first and second movable member to accomplish the locking. The solenoid is actuated by connecting the seat belt in the cab of the motor vehicle.

U.S. Pat. No. 3,977,488, issued on Aug. 31, 1976, to T. Kameyama teaches a shift locking device for a manual transmission which prevents the manual transmission shifting rod from shifting into a gear unless a predetermined safety measure such as wearing a safety belt has been taken by the driver. This device has no security protection from outside deactivation by a thief and also requires the normal steering column lock used in automotive vehicles. The device also does not prevent accidental damage to the manual transmission or the device itself should the thief try to force the shift lever to a desired position.

U.S. Pat. No. 3,788,422, issued Jun. 29, 1974, to L. L. Bowler teaches a push button transmission selector mechanism and electronic lock and control logic for preventing unauthorized use of a motor vehicle. The ignition circuit and selector mechanism of the motor vehicle is locked until a code number is entered by the operator.

U.S. Pat. No. 4,884,654 issued Dec. 5, 1989, to Duilio Durigon discloses a transmission control locking device. A locking rod with a slot formed therein is mounted on a clutch operating lever. The locking rod is free to slide in a bore formed in a locking frame having slots for receiving a tapered locking plate mounted for movement at right angles to the locking rod. The locking plate is operated by a plunger of a solenoid through the use of a pivotable arm. A coil spring is connected between the end of the pivotable arm, to which the locking plate is connected, and the locking frame. The coil spring urges the locking plate towards the locking frame. The solenoid is controlled by an electronic circuit which switches power to the solenoid according to the state of a control signal on an input. The device locks the clutch operating lever with the locking plate when the solenoid is de-energized. Energization of the solenoid allows disengagement of the clutch and permits normal operation thereof.

U.S. Pat. No. 5,431,244 issued Jul. 11, 1995, to Jose D. Possobom discloses a locking device having an enclosed box, an actuating pin mounted inside a double action solenoid and relay to command the solenoid. The solenoid is double action because it commands the actuating pin forward and back. The actuating pin actuates in a slot in a part assembled on the reverse shift bar.

U.S. Pat. No. 5,179,868 issued Jan. 19, 1993, to Roland Thibeault discloses a motor vehicle transmission locking device for use with automatic and manual transmissions. The device uses a solenoid to lock a pin in a notch formed on an existing transmission parking shaft to lock the transmission in the parked position. The solenoid is mounted on the inside of the transmission case and may be activated by an encoder/decoder circuit and may be activated by a switch.

Each of those known locking devices utilizing a solenoid to actuate locking means rely on the vehicle battery exclusively for power, resulting in problems if the vehicle battery is dead or disconnected from the power system. Additionally, many of the known devices utilize some type of rigid rod to lock the drive train of a vehicle. Consequently, the device must be installed near the transmission or clutch. Installation of such devices is hindered, as a result, since the clutch and transmission may not be easily accessible or sufficient space may not be available on many vehicle models.

What is needed is an easily installed, inexpensive anti-theft system which can utilize existing shift locking mechanisms when they are already in place on a vehicle, such as various automatic shift lever locking means. And furthermore, the control for the anti-theft device should be coded to the same identifying features of the proper authorized operator(s) of the vehicle to prevent use by unwanted others.

SUMMARY OF THE INVENTION

In order to overcome the many problems inherent in the complicated and expensive prior art devices, there is provided by the present invention a novel and improved gear shifter lock control which may use existing shifter locks as found on automatic transmissions or simple solenoid locks installed on existing shifter levers by providing a switch override which must be opened by a biometric sensor and central processing unit verifying the matching of biometric sensing information of the user compared with stored biometric sensing information of the authorized user(s).

An additional object of the present invention is that the biometric sensing means enables at least one individual, preferably more, to input at least one, but preferably, various biometrically measurable characteristics into the sensing means.

An associated object of the present invention is that the programmable information processing means is capable of being programmed, using a keypad and biometric sensor, with information about at least one biometrically measurable characteristic of at least one individual.

A further object of the present invention is that the programmable information processing means is capable of receiving the biometrically measurable characteristic information from the biometric sensing means and then comparing the received biometrically measurable characteristic information with the programmed biometrically measurable characteristic information.

An ensuing object of the present invention is that the programmable information processing means is capable of outputting an activation signal in response to a match in the biometrically measurable characteristic information.

A contributory object of the present invention is to use a gear shifter lock control for locking a gear shifter in a stationary position prohibiting the movement of the gear shifter from that position.

A further contributory object of the present invention is that the gear shifter lock control is capable of receiving the activation signal from the information processing means to releasing the gear shifter upon receiving the correct activation signal.

An auxiliary object of the present invention is that the biometric sensing means can be mounted on the gear shift, steering wheel, dash board, seat or any other location incorporated on or within the vehicle or equipment.

An ancillary object of the present invention is that the biometric sensing means may be covered from view by a covering means which is capable of being moved to access the biometric sensing means.

Yet another object of the present invention is that the biometric sensing means can be one or more biometric sensing means taken from the list including a fingerprint scanner, as a retinal scanner, a voice or face recognition system or scanner, a DNA sensor, or other biometric sensing means.

An extra object of the present invention is that the biometric sensing means may be mounted in a location within the vehicle normally hidden from view.

Still another object of the present invention is that the alarm signal can be one or more alarm signals taken from the list including a means for displaying a message on a window of the vehicle, outside the vehicle or on a surface adjacent to the vehicle, a means for producing sound audible outside the vehicle, a means for producing a pain inducing loud sound inside the vehicle, a means for producing a strobe light effect externally on the vehicle, or other means for signaling an alarm.

A subsequent object of the present invention is that the alarm signal is activated only if the biometrically measurable information does not match, thereby avoiding false alarms.

A next object of the present invention is that the gear shifter lock control uses a solenoid which engages a control element of the gear shifter capable of locking the gear shifter.

A successive object of the present invention is that the gear shifter lock control uses an override control switch attached to an existing gear shifter lock control in the vehicle. The override control switch blocks a normal activating signal for unlocking the gear shifter until the programmable information processing means outputs an activation signal.

A separate object of the present invention is that the biometric shifter lock control is powered by the vehicle power system.

A succeeding object of the present invention is that there is included a battery for powering the biometric shifter lock control.

A further succeeding object of the present invention is that there is included a backup battery for powering the biometric shifter lock control.

An associated object of the present invention which overcomes the aforementioned disadvantages of the heretofore-known devices and methods of this general type is that the anti-theft lock for automotive vehicles does not lock or unlock upon loss of power due to the backup battery.

Another corollary object of the present invention is that it will not disable any starter, kill switch or on-board computer rendering the vehicle functional. The only device that will be locked is the shifter lever or other means for controlling engagement of a transmission.

A different object of the present invention is providing a simple construction which can be easily incorporated into an automotive transmission at the factory or added to an existing shifter in vehicles, equipment, and machinery that are presently in operation.

A final object of the present invention is to provide a versatile anti-theft lock that may be applied to any kind of vehicle or equipment that uses a gear shifter, or lever, or electromagnetic pulse, or other means for controlling engagement of a transmission on land, air, or water.

In brief, a hidden device is located in the passenger compartment, or positioned on a gear shifter knob which may be covered, consisting of a relay and a shifter lock control means, wiring, a programmed central processing unit (CPU) or chip and a disarming device consisting of a biometrics device which could be a fingerprint scanner, a retinal scanner, a voice or face recognition system, a DNA sensor or other device programmed to operate only upon recognition of a unique biometrically measurable characteristic of one or more authorized users whose biometric data is programmed into the system.

As a person enters the vehicle, the vehicle will open, start and function normally with only one difference: the person will not be able to place the vehicle or equipment in gear until that person completes a biometric verification. Upon verification, the shifter lock control or override mechanism will be released and the vehicle, equipment, or machinery will function normally. If the person cannot pass the biometric verification, the shifter lock control will not be released and the vehicle, equipment, or machinery will not be able to be shifted into a gear to engage the transmission. Optionally, thereupon, a notice could be projected onto the front windshield by a projector-like device with a preprogrammed projection such as but not limited to the following: "Stolen car. Call police." or "Help! Call police." This will be in a bright luminescent color while simultaneously, an internal high intensity siren may be engaged so vandalism or interior theft will be impossible due to the thief having to exit the vehicle to escape the noise. There may also be strobe light effects placed in the vehicle's front headlights or tail-lights which may also be triggered and the general public and police will be able to notice where the stolen vehicle is without much doubt or difficulty.

The present invention will not disable any starter, kill switch or on-board computer rendering the vehicle functional.

A primary advantage of the present invention is that the biometric shifter lock control releases and locks a gear shifter upon recognition of biometrically measurable information of only an authorized individual.

A further advantage of the present invention is that the programmable information processing means is capable of receiving then comparing the received biometrically measurable characteristic information with the pre-programmed biometrically measurable characteristic information.

An ensuing advantage of the present invention is that the programmable information processing means is capable of outputting an activation signal in response to a match in the biometrically measurable characteristic information.

Yet another advantage of the present invention is that the biometric sensing means can be one or more biometric sensing means taken from pre-existing technologies.

Still another advantage of the present invention the alarm signal can be one or more alarm signals taken from pre-existing technologies.

A related advantage of the present invention is that the override of the present invention can be used with present shift locking technology already built into the vehicle or equipment or machinery.

A successive advantage of the present invention there is included a backup battery for powering the biometric shifter lock control. The anti-theft lock for automotive vehicles will therefore not lock or unlock upon loss of power.

A simple advantage of the present invention is that there are no transmission or shifter design changes required for the vehicle, equipment, or machinery.

A practical advantage of the present invention is unlike traditional movement sensing anti-theft devices, which can be easily and unreliably set off by circumstances other than possible theft to disrupt an environment with annoying and loud sound, this device requires a failed biometric measurement to sound off, avoiding false alarms.

Yet another advantage of the present invention is that the biometric sensing means can be built into the existing gear shift knob and protected by a flip cover, steering wheel, dash board, seat or any other location incorporated on or within the vehicle or equipment.

Still another advantage of the present invention is that the components of the present invention can be aesthetically hidden in many places to adapt to older and newer model vehicles and equipment.

BRIEF DESCRIPTION OF THE DRAWINGS

These and other details of my invention will be described in connection with the accompanying drawings, which are furnished only by way of illustration and not in limitation of the invention, and in which drawings.

BEST MODE FOR CARRYING OUT THE INVENTION

In FIGS. 1–11, a biometric shifter lock control 20 and 20A has a biometric sensor 22 and 22A with a finger print scanning screen 21 in some cases, a central processing unit 24, an auxiliary battery 23, and an override control programmed into the central processing unit based upon matching stored biometric information about authorized users with scanned in biometric information to release a locking means on a shifter for actuating a transmission on any vehicle, equipment, machinery, on land, water, and air. The examples shown in the drawings are for the most common preferred use of the present invention on a vehicle having an automatic or standard shift.

Figure 3:
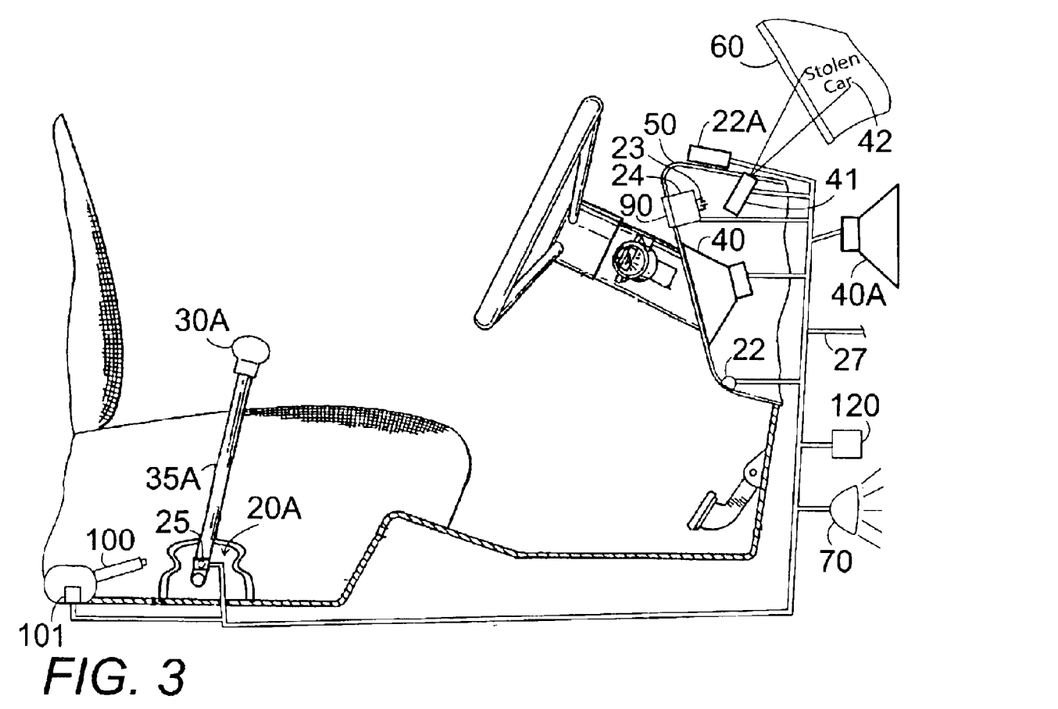
FIG. 3 is a side elevational view in partial section of a vehicle interior having a standard gear shift showing the components of the invention mounted in the vehicle.

FIGS. 1–8 illustrate a biometric shifter lock control 20, 20A for the programmed overriding of a locking device for a vehicle gear shift 35 and 35A and releasing the gear shift upon recognition of biometrically measurable information of an authorized individual based on a comparison with stored biometric information in a central processing unit 24, sending a signal that a match has been made. The biometric shifter lock control 20, 20A includes a biometric sensing means, such as a fingerprint scanner 22 with a scanner window 21, or any other biometric sensing means 22A such as a retinal scanner, a voice or face recognition system, or a DNA sensor. The biometric shifter lock control 20, 20A further includes a programmable information processing means 24, such as a central processing unit (CPU) or other programmable component, and a programmed control of a gear shifter locking means, such as a solenoid 25, or other locking switch 102, 142, and 182 which locks a gear shifter and may be built-in as in the case of a number of automatic shift locks or installed as in the case of a solenoid 25 lock for a standard shift, as seen in FIG. 3.

Figure 5:
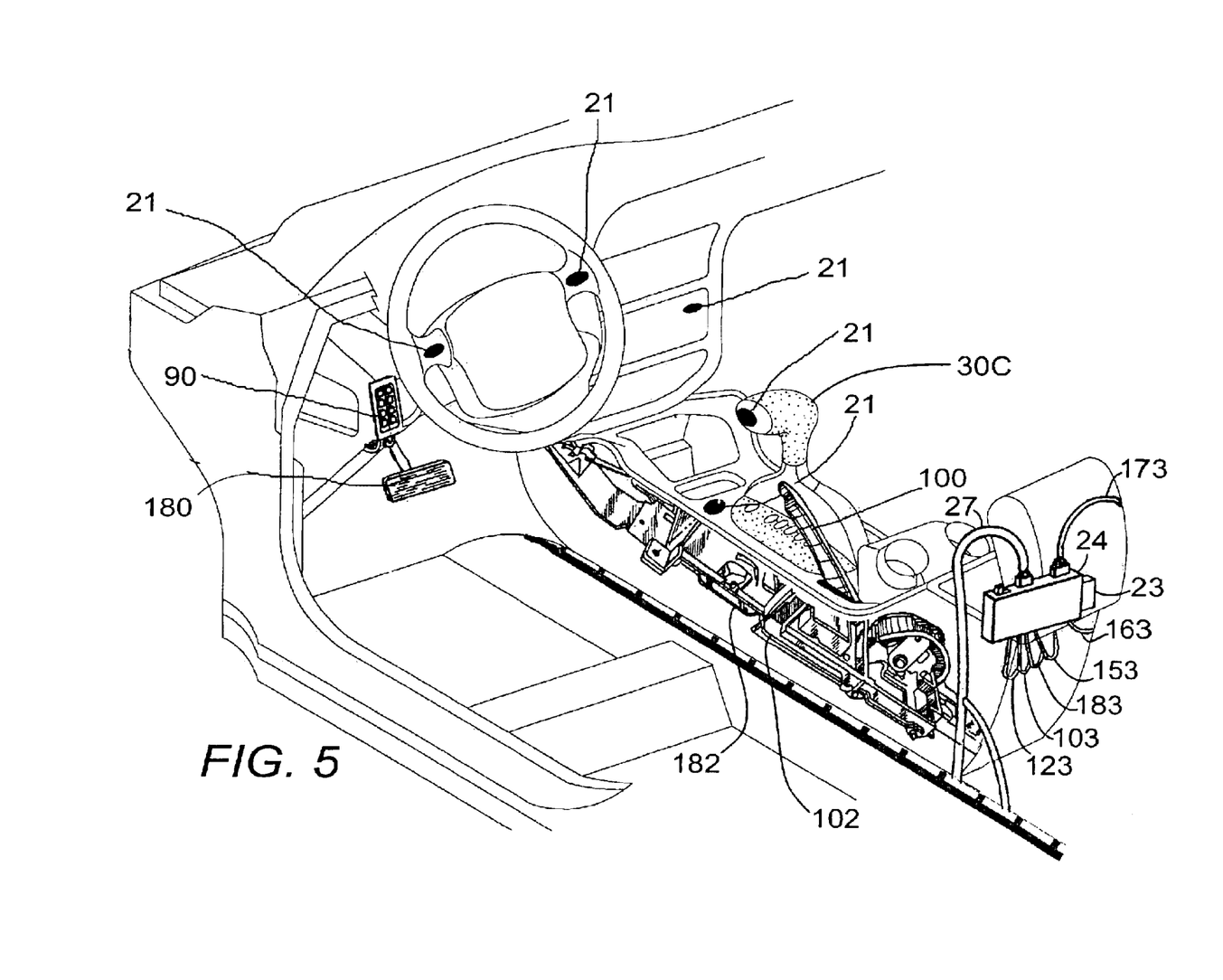
FIG. 5 is a perspective view in partial section of a vehicle interior having an automatic shift showing various locations for a biometric sensor and a number of various shift locking means built into the vehicle as well as the central processing unit of the shifter lock control.

In FIG. 5, the wiring 123, 103, 183, and 153 from other sensing means such as a foot brake pedal 180 or hand brake (emergency brake) 100 to the shift lock means, such as switches 182 and 102 may be wired through the CPU 24 to override the sensors and only allow a one-way signal to release the shift lock means upon verification of identity through the biometric sensor 22 and the CPU 24 matching operation.

Figure 4:
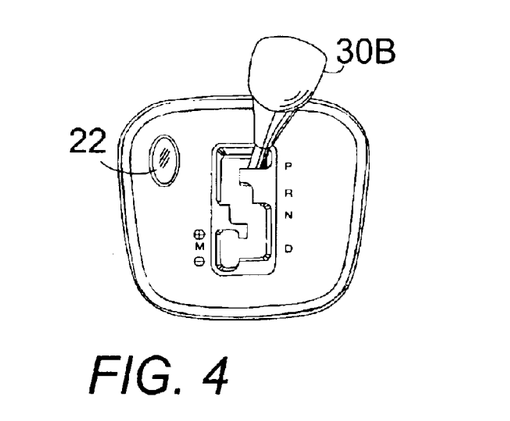
FIG. 4 is a plan view of an automatic shift having the biometric sensor mounted on the top of the shift console.

In FIGS. 1, 2, and 4–8, the biometric sensing means is a fingerprint scanner 22 including a scanning screen 21, which may be built into an end of the handle 30 of the gear shift 35 as seen in FIGS. 2 and 5–8, for sensing a biometrically measurable characteristic of an individual. The sensing means attached to a location preferably with a vehicle interior, as seen in FIGS. 4 and 5 enables the individual to input the biometrically measurable characteristic to the sensing means and to the CPU 24.

Figures 1, 2:
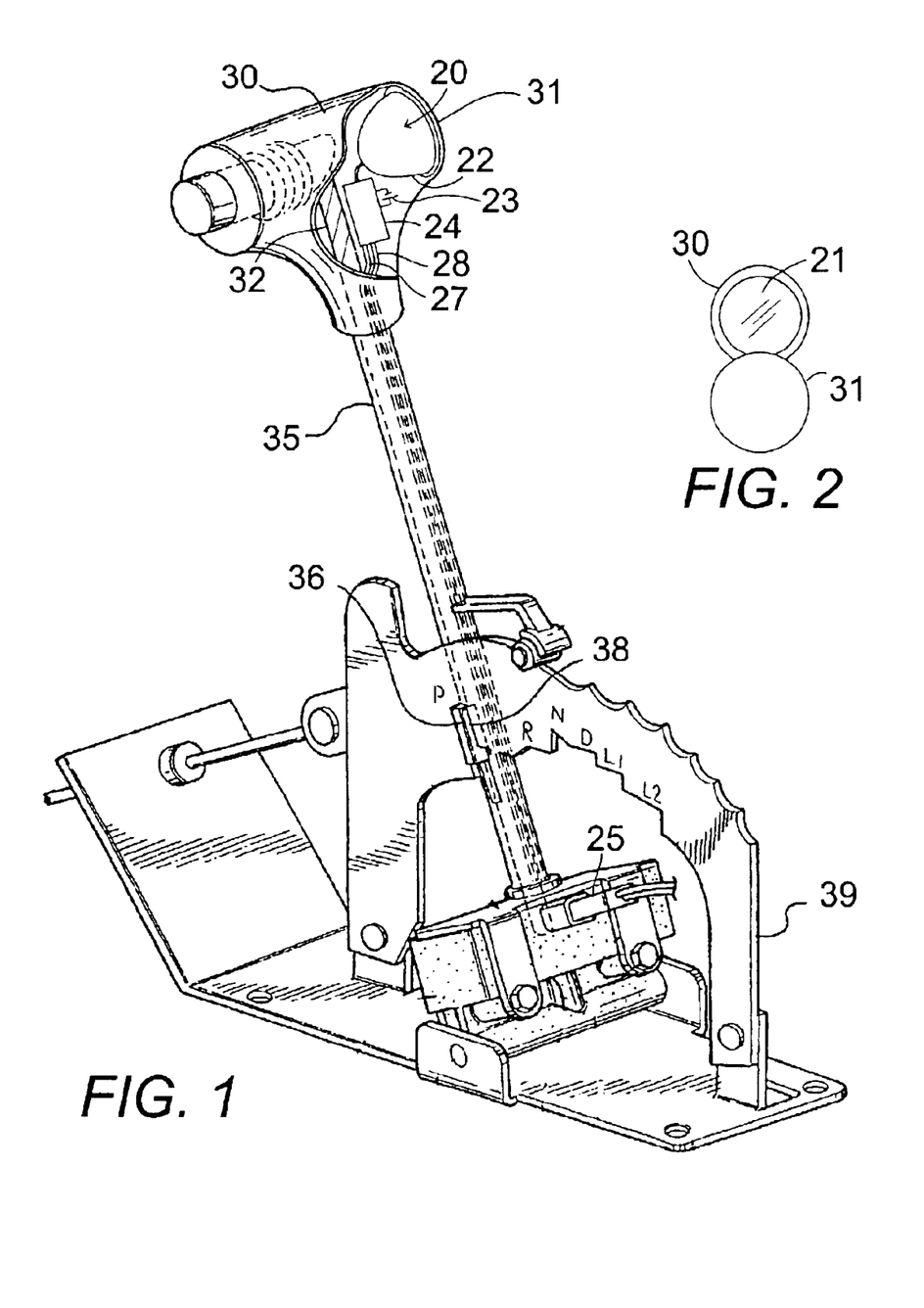
FIG. 1 is a perspective view in partial section of a gear shift of an automatic transmission vehicle having the biometric scanner for the shifter lock control built into the handle of the gear shift.
FIG. 2 is an end elevational view of the handle of the gear shift of FIG. 1 showing a pivotable cover pivoted open to reveal a scanning surface of the biometric shifter lock control.

In FIGS. 1, 3 and 4, a programmable information processing means 24, such as a central processing unit (CPU,) is capable of being programmed through the biometric sensor 22 and 22A and a keypad 90, as seen in FIGS. 3 and 5 which may have a read out screen and may be a touch sensitive screen, with information about at least one biometrically measurable characteristic of at least one individual as an authorized user. It is also capable of receiving biometrically measurable characteristic information from the biometric sensing means 22, 22A and then able to compare the received biometrically measurable characteristic information with the programmed biometrically measurable characteristic information. It is further capable of outputting an activation signal in response to a match in the biometrically measurable characteristic information to release the override on the shift locking means to allow it to function normally.

In FIGS. 1 and 5–7 gear shifter locking means, such as a solenoid lock 25 or other electrical, electro-mechanical, vacuum or other switching shift lock means 102, 142, and 182 are built in as standard equipment on automatic shifts based on control switches associated with the foot brake 180, hand brake (emergency brake) 100, ignition or other devices of the vehicle needing to be activated in order to release the shift lock means.

In FIGS. 1, 3 and 4 a gear shifter locking means, such as a solenoid 25 for locking a gear shift 35, 35A in a stationary position to prohibit the movement of the gear shift from that position is capable of receiving the activation signal from the information processing means to release the gear shift upon receiving the activation signal.

In FIGS. 1, 2, and 5–8, the biometric sensing means 22 with scanning window 21 is mounted in the gear shift handle 30 and 30C.

In FIGS. 1 and 2, the biometric sensing means, such as a fingerprint scanner 22, may be mounted in a location within the vehicle normally hidden from view or covered from view by a covering means, such as a rotatable cover lid 31 on the gear shift knob 30, capable of being moved to access the viewing screen 21 of the fingerprint sensor 22 of the biometric sensing means, as seen in FIG. 2.

The biometric sensing means comprises a sensing means taken from the list of biometric sensing means including a fingerprint scanner 22 and other biometric sensors 22A (shown mounted on the dashboard 50 in FIG. 3) such as a voice recognition system, a face recognition scanner, a retinal scanner, a DNA sensor, or other biometric sensing means.

FIG. 3 illustrates aural alarm signals which can be projected through internal speakers 40 and external speakers 40A and visual alarm signals which can be projected onto the windshield 60 of the vehicle or other exterior parts of the vehicle or the ground surrounding the vehicle and activated when and if the biometrically measurable information does not match.

FIG. 3 illustrates the alarm signaling means which provide alarm signals including a light projector means 41 for displaying a message 42 on a windshield 60 of the vehicle, an external speaker means 40A for producing sound audible outside the vehicle, an internal speaker means 40 for producing a pain inducing loud sound inside the vehicle, and a flashing light means 70 for producing a strobe light effect externally on the vehicle.

In FIG. 1, the gear shifter locking means comprises a built-in solenoid 25 activated by a brake sensor in an automatic shift vehicle, the solenoid capable of engaging and maintaining stationary a transmission control element, such the gear shift itself or in this case a movable shaft 32 inside the gear shift 35 or the gear shift itself capable of locking the gear shift by having a spring (not shown) at the bottom of the shaft 32 normally biasing a pawl 36 protruding from the shaft 32 engaging a detent 38 in the shift gate bracket 39. An electric override switch in the acts as an override or interrupt to block the signal from the brake switch until a biometric match is computed in the CPU 24 and the override switch is opened to enable normal functioning of the shift.

In FIGS. 1, 3 and 5, the biometric shifter lock control is shown to be powered by the vehicle power system through connecting wire 27 which can run through the inside of the gear shift arm 35 and 35A to connect with the vehicle power system.

In FIGS. 1, 3 and 5, a backup battery 23 for powering the biometric shifter lock control may be used in case of vehicle battery failure or disconnection or, may be used as the primary source.

In FIG. 5, a vehicle interior has an automatic shift 30C and various optional locations for a biometric sensor and viewing window 21 and a number of various shift locking means, such as switches 102 and 182 built into the vehicle as well as the central processing unit 24 of the shifter lock control, which is shown enlarged and away from the rest of the drawing, but would actually be positioned in a hidden location within the shift console or other location.

A keypad 90 mounted on the dashboard 50 or other convenient location would have a readout screen and the keypad could be part of a touch screen and would connect to the CPU 24 via electrical wiring 163. And the biometric sensor 22 and scanner window 21 is connected to the CPU 24 by wiring means 173. The keypad 90 is programmed by an authorized user to set up a record of the authorized user's finger prints or other biometric information via the scanning window 21 of the biometric sensor 22 and into the CPU 24 and to authorize other users with the input of their finger prints or other biometric information or remove authorizations of other users, as shown in the flow chart of FIG. 11.

Figure 6:
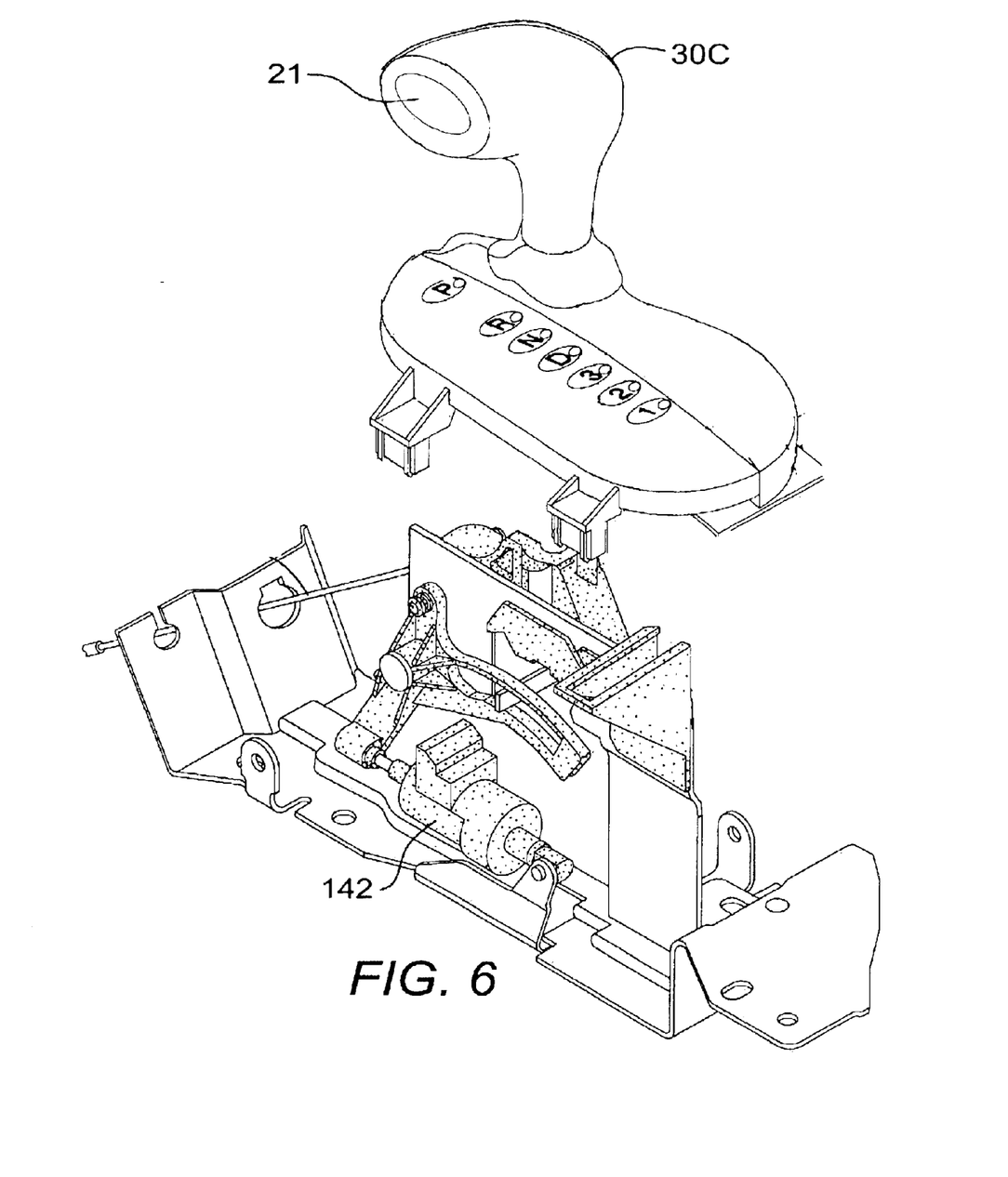
FIG. 6 is a broken perspective view of an automatic shift showing a biometric sensor in the shift handle and the exposed workings of the automatic shift including a built-in shifter lock switch.
Figure 7:
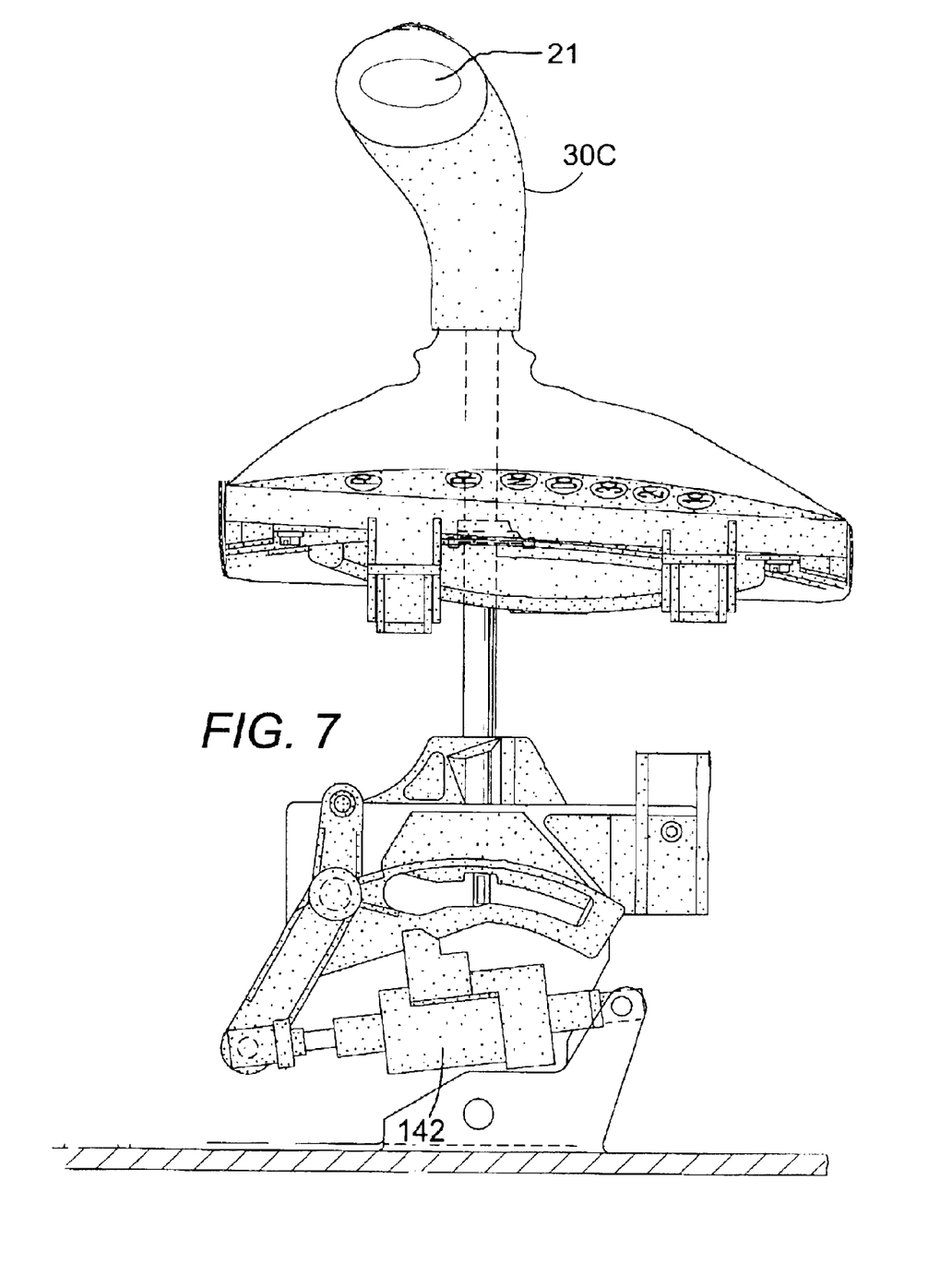
FIG. 7 is a side elevational view of the automatic shift of FIG. 6.

The foot brake 180 and hand brake (emergency brake) 100 both have sensors that control shift lock switches 182 and 102 built into the vehicle in FIG. 5 and switch 142 in FIGS. 6 and 7. The wires 103 and 183 from the brake sensors and wires from other sensors, such as a wire 123 from a speed sensor used as a safety on standard shift vehicles, are connected through the CPU 24 so that a oneway switch within the CPU 24 controls the activation of the shift locks to release them and allow operation of the shift after a biometric match has been recognized by the CPU 24. This as a safeguard that an intended vehicle thief will not be able to cross the wires to override the shift lock.

Figure 8:
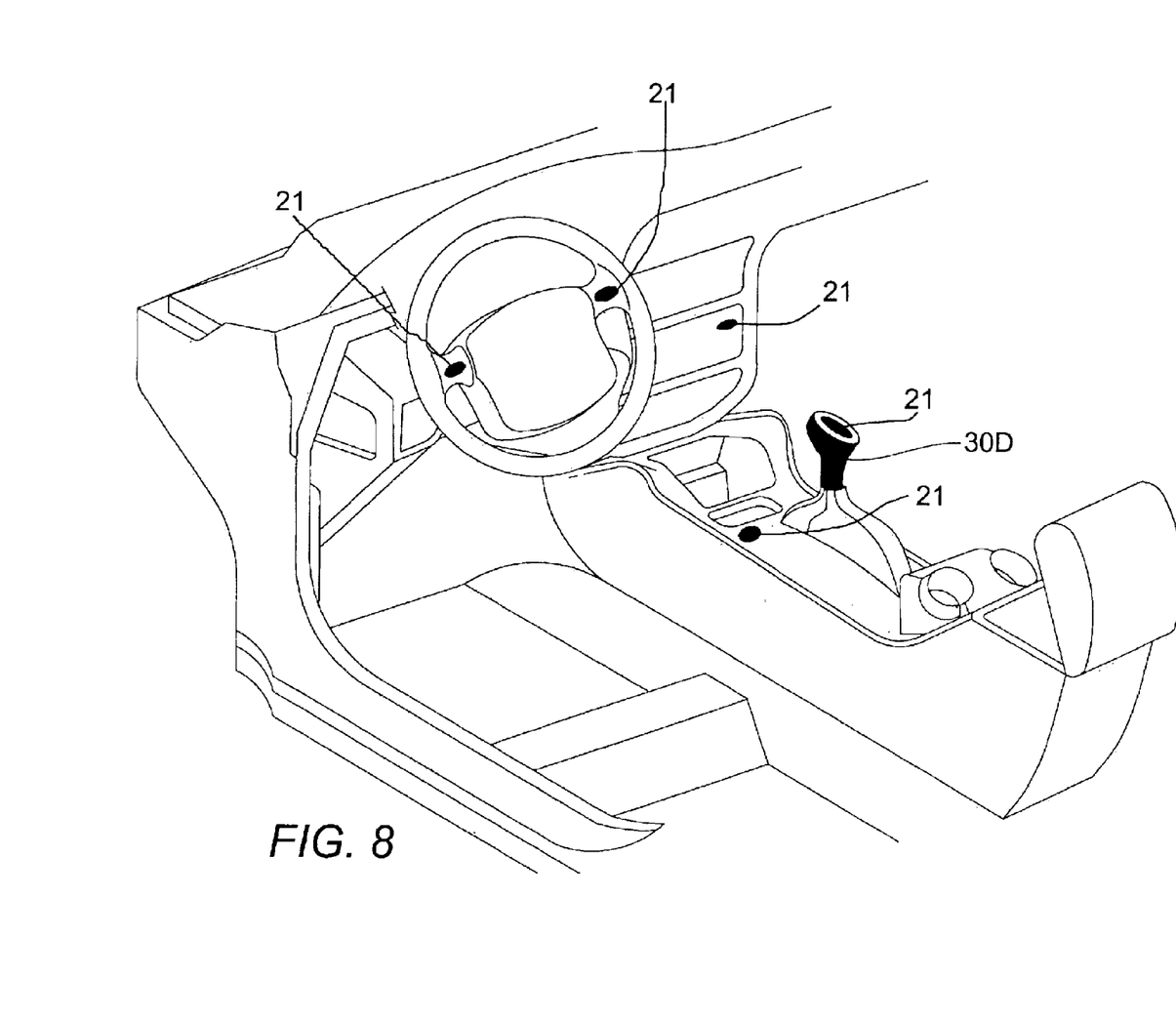
FIG. 8 is a perspective view of a vehicle interior having a standard shift showing various possible locations for a biometric sensor.

In FIG. 8 a vehicle interior has a standard shift 30D and various possible locations for a biometric sensor and scanning window 21 are shown.

Figure 9:
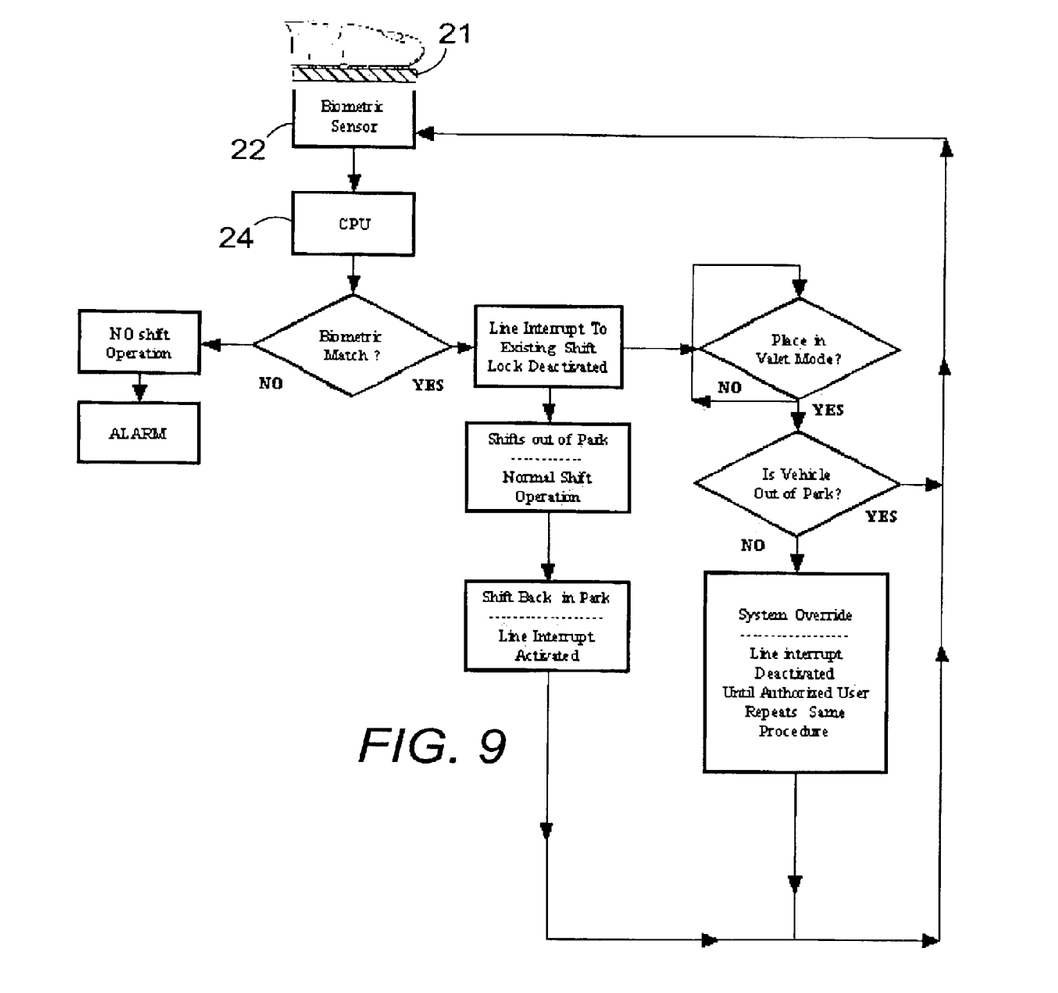
FIG. 9 is a diagrammatic view of a flow chart showing the steps involved in using the shifter lock control of the present invention on an automatic shift vehicle.

In FIG. 9 the steps involved in using the shifter lock control of the present invention on an automatic shift vehicle include inputting biometric information, such as a finger print, through the scanning window 21 of a biometric scanner 22 and into the CPU 24. If the biometric information does not match the biometric information stored in the CPU for authorized users the shift will not operate and an alarm is activated. If a match is made, the authorized user may then shift normally. A valet mode is also possible for an authorized user to override the shifter lock control to enable a vehicle to be serviced at a garage, for example.

Figure 10:
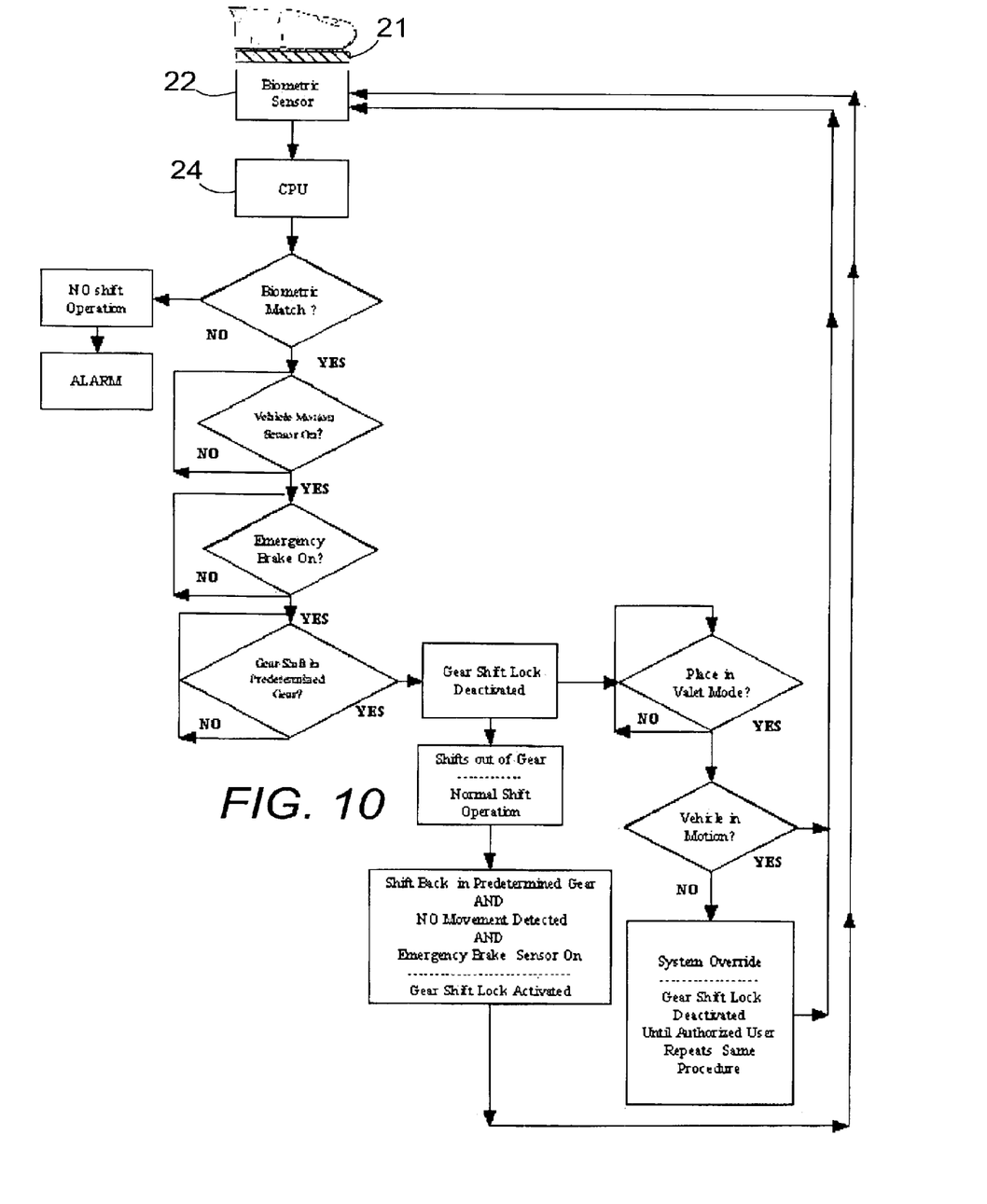
FIG. 10 is a diagrammatic view of a flow chart showing the steps involved in using the shifter lock control of the present invention on a standard shift vehicle.
Figure 11:
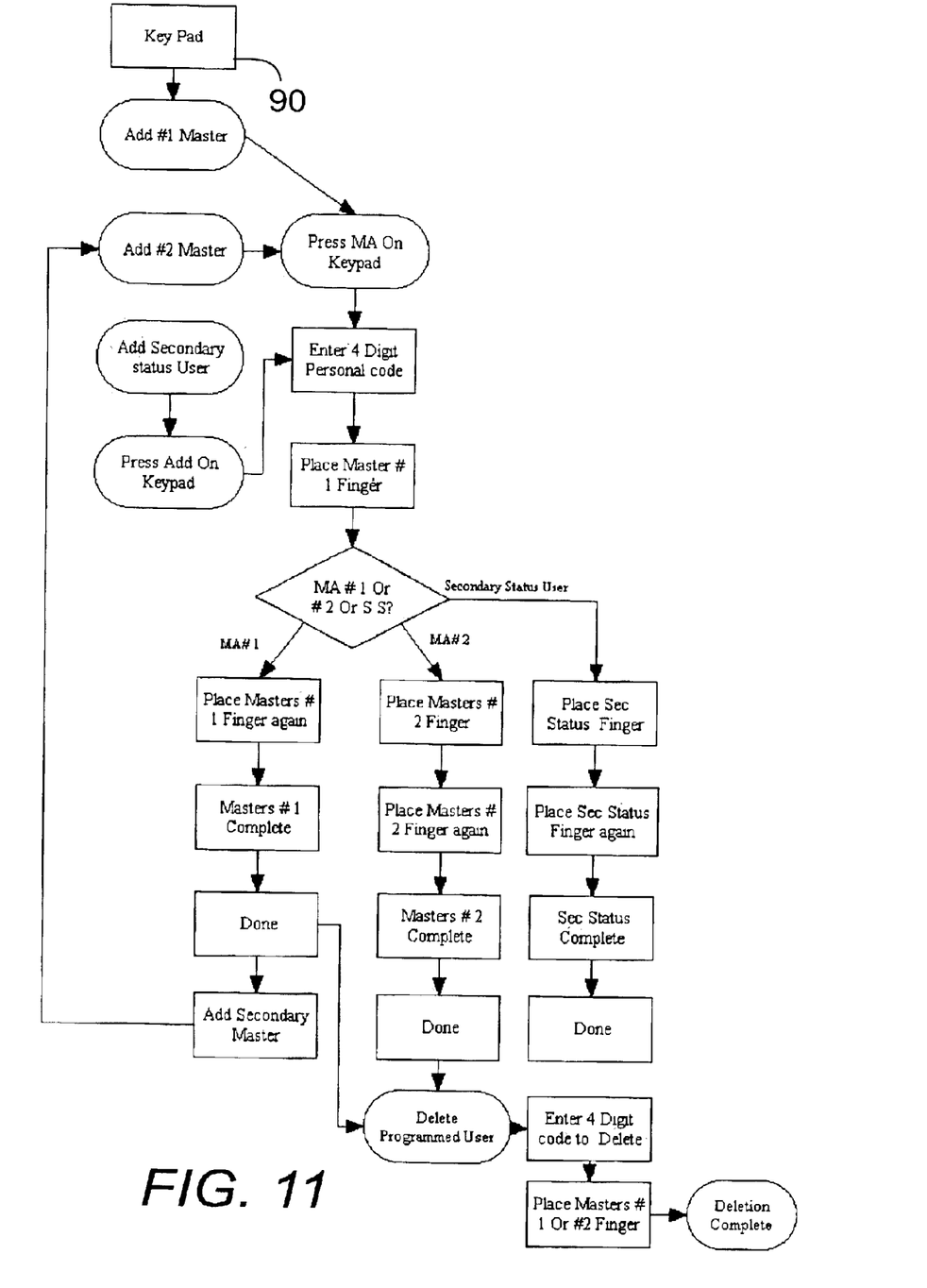
FIG. 11 is a diagrammatic view of a flow chart showing the steps involved in programming the shifter lock control of the present invention.

In FIG. 10 the steps involved in using the shifter lock control of the present invention on a standard shift vehicle include inputting biometric information, such as a finger print, through the scanning window 21 of a biometric scanner 22 and into the CPU 24. If the biometric information does not match the biometric information stored in the CPU for authorized users the shift will not operate and an alarm is activated. If a match is made and the vehicle motion sensor 120 in FIG. 3 and the emergency brake sensor 101 in FIG. 3 and the shift is in a predetermined gear, the authorized user may then shift normally. A valet mode is also possible for an authorized user to override the shifter lock control to enable a vehicle to be serviced at a garage, for example.

It is understood that the preceding description is given merely by way of illustration and not in limitation of the invention and that various modifications may be made thereto without departing from the spirit of the invention as claimed.

What is claimed is:

1. A biometric shifter lever lock override control device for controlling a gear shifter lever and releasing the gear shifter lever upon recognition of biometrically measurable information of an authorized individual, the device comprising:

a biometric sensing means for sensing a biometrically measurable characteristic of an individual, the sensing means attached in proximity to a shifter means to enable the individual to input the biometrically measurable characteristic to the sensing means;

a programmable information processing means programmed with information about at least one biometrically measurable characteristic of at least one individual and programmed for receiving biometrically measurable characteristic information from the biometric sensing means and comparing the received biometrically measurable characteristic information with the programmed biometrically measurable characteristic information and programmed for outputting an activation signal in response to a match in the biometrically measurable characteristic information;

a shifter lever lock override control means for controlling activation of a locking means for a gear shifter lever on an existing shifter lock as found on a vehicle with an automatic transmission and a simple solenoid lock installed on an existing shifter lever on a vehicle with a standard transmission by providing a switch override which must be opened by signals from the biometric sensing means and the programmable information processing means verifying the matching of biometric sensing information of the user compared with stored biometric sensing information of the authorized user to maintain the gear shifter lever in a stationary locked position and prohibit the movement of the gear shifter lever from that locked position, the gear shifter lever lock override control means adapted for receiving the activation signal from the information processing means releasing the override control means to permit actuation of the gear shifter lever upon receiving the activation signal so that overriding of the near shift lever locking means is controlled and not other regular operations of the vehicle so that all other operations of the vehicle function normally and when the override of the locking means for the gear shift lever is released the means for locking the shift lever operates in a normal mode enabling normal use of the shift lever.

2. The device of claim 1 wherein the locking means for a gear shifter lever is built into a vehicle as standard equipment and the locking means interacts through a connecting means to an operational sensing means and the connecting means is interconnected with the information processing means to override interaction between the operational sensing means and the locking means.

3. The device of claim 1 wherein the biometric sensing means is mounted in a location selected from the list of locations including the gear shift, steering wheel, dash board, seat and a location normally associated with a vehicle and a piece of equipment.

4. The device of claim 3 wherein the biometric sensing means is covered from view by a covering means which is capable of being moved to access the biometric sensing means.

5. The device of claim 1 wherein the biometric sensing means is mounted in a location within a vehicle normally hidden from view.

6. The device of claim 1 wherein the biometric sensing means comprises a sensing means taken from the list of biometric sensing means including a fingerprint scanner, a voice recognition system, a face recognition scanner, a retina scanner, and a DNA sensor.

7. The device of claim 1 further comprising an alarm signal which is activated if the biometrically measurable information does not match.

8. The device of claim 7 wherein the alarm signal comprises an alarm signal taken from the list of alarm signals including a means for displaying a message on a window of the vehicle, a means for producing sound audible outside the vehicle, a means for producing a pain inducing loud sound inside the vehicle, a means for producing a strobe light effect externally on the vehicle, and a means for displaying a visual message on a surface exterior to the vehicle.

9. The device of claim 1 wherein the locking means for a gear shifter lever comprises a switching means engaging a control element of the gear shifter lever for locking the gear shifter lever.

10. The device of claim 9 wherein the switching means comprises a solenoid.

11. The device of claim 9 further comprising at least one operational sensing means communicating with the programmable information processing means to act as an additional control means.

12. The device of claim 1 wherein the shifter lever lock override control means for controlling activation of a locking means for a gear shifter lever comprises an override control switch attached to an existing gear shifter lever locking means in the vehicle, the override control switch normally blocking a normal activating signal for unlocking the gear shifter until the programmable information processing means outputs the activation signal.

13. The device of claim 1 wherein the biometric shifter lever lock override control device is powered by the vehicle power system.

14. The device of claim 13 further comprising a backup battery for powering the biometric shifter lever lock override control device.

15. The device of claim 1 further comprising a battery for powering the biometric shifter lever lock override control device.

* * * * *